United States Patent
Guan et al.

(10) Patent No.: US 11,445,388 B2
(45) Date of Patent: Sep. 13, 2022

(54) COMMUNICATION METHOD AND APPARATUS FOR INDICATING BEAM QUALITY

(71) Applicant: HUAWEI TECHNOLOGIES CO., LTD., Guangdong (CN)

(72) Inventors: Peng Guan, Chengdu (CN); Xi Zhang, Kanata (CA); Min Zhang, Shenzhen (CN); Hongzhe Shi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 158 days.

(21) Appl. No.: 16/858,327

(22) Filed: Apr. 24, 2020

(65) Prior Publication Data
US 2020/0260305 A1   Aug. 13, 2020

Related U.S. Application Data

(63) Continuation of application No. PCT/CN2018/115626, filed on Nov. 15, 2018.

(30) Foreign Application Priority Data

Nov. 17, 2017  (CN) .......................... 201711146689.9

(51) Int. Cl.
*G06F 11/00*     (2006.01)
*H04J 3/14*      (2006.01)
(Continued)

(52) U.S. Cl.
CPC ........... *H04W 24/08* (2013.01); *H04L 5/0048* (2013.01)

(58) Field of Classification Search
CPC ..... H04W 24/08; H04W 24/02; H04W 24/00; H04W 24/10; H04L 5/0048
(Continued)

(56) References Cited

U.S. PATENT DOCUMENTS

2006/0262939 A1   11/2006   Buchner et al.
2012/0207044 A1   8/2012    Johansson et al.
(Continued)

FOREIGN PATENT DOCUMENTS

CN   1898943 A      1/2007
CN   101001166 A    7/2007
(Continued)

OTHER PUBLICATIONS

Samsung ("on beam management, measurement and reporting" R1-1715940, Nagoya, Japan, Sep. 18-21, 2017 ) (Year: 2017).*
(Continued)

*Primary Examiner* — Maharishi V Khirodhar
(74) *Attorney, Agent, or Firm* — Womble Bond Dickinson (US) LLP

(57) ABSTRACT

This disclosure relates to a communication method and apparatus. The method includes: receiving, by a terminal device, a reference signal sent by a network device; measuring the reference signal to obtain at least one piece of beam quality; and reporting specified differential beam quality indication information to the network device, where the specified differential beam quality indication information is used to indicate that beam quality reporting is abnormal, and/or the specified differential beam quality indication information is used to indicate that beam quality corresponding to the specified differential beam quality indication information is a specified value. A corresponding apparatus is further disclosed. According to the solution in this disclosure, specified differential beam quality indication information is used to indicate that beam quality reporting is abnormal or indicate that beam quality is a specified value, so that beam quality can be accurately reported.

8 Claims, 11 Drawing Sheets

| Differential beam quality indication information Y | Difference from a reference value of beam quality |
|---|---|
| 0000 | 0 * step size |
| 0001 | −1 * step size |
| 0010 | −2 * step size |
| ... | ... |
| 1110 | Specified value |
| 1111 | Abnormal state |

(51) Int. Cl.
  *H04L 1/00*   (2006.01)
  *H04W 24/08*  (2009.01)
  *H04L 5/00*   (2006.01)
(58) Field of Classification Search
  USPC .......................................................... 370/252
  See application file for complete search history.

(56) References Cited

U.S. PATENT DOCUMENTS

| | | | |
|---|---|---|---|
| 2012/0257522 A1 | 10/2012 | Adachi et al. | |
| 2013/0148533 A1 | 6/2013 | Li et al. | |
| 2013/0343217 A1 | 12/2013 | Pan et al. | |
| 2016/0353444 A1 | 12/2016 | Popovic et al. | |
| 2017/0117997 A1 | 4/2017 | Park et al. | |
| 2018/0249359 A1 | 8/2018 | Woods et al. | |
| 2018/0270717 A1* | 9/2018 | Kakishima | H04W 24/10 |
| 2020/0322030 A1* | 10/2020 | Yuan | H04B 7/0632 |

FOREIGN PATENT DOCUMENTS

| | | | | |
|---|---|---|---|---|
| CN | 101917256 A | 12/2010 | | |
| CN | 102036296 A | 4/2011 | | |
| CN | 102149100 A | 8/2011 | | |
| CN | 102918791 A | 2/2013 | | |
| CN | 103428790 A | 12/2013 | | |
| CN | 103944686 A | 7/2014 | | |
| CN | 107211249 A | 9/2017 | | |
| EP | 1434365 A2 | 6/2004 | | |
| EP | 2536281 A1 * | 12/2012 | ........... | C09D 5/1625 |
| WO | 2017077753 A1 | 5/2017 | | |

OTHER PUBLICATIONS

NEC (R1-1712997, "Differential L1-RSRP reporting", Prague, Czech Republic, Aug. 21-25, 2017). (Year: 2017).*
Spreadtrum Communications, R1-1715510, "Differential RSRP report and beam indication", Nagoya, Japan, Sep. 18-21, 2017 (Year: 2017).*
Samsung, R1-1715944, "L1 RSRP reporting for beam management", Nagoya, Japan, Sep. 18-21, 2017 (Year: 2017).*
Nokia, Nokia Shanghai Bell ( R1-1716499, "On beam grouping and reporting", Nagoya, Japan, Sep. 18-21, 2017). (Year : 2017).*
3GPP TSG RAN WG1 Meeting #90,R1-1713757:"Beam reporting for beam management",Huawei, HiSilicon,Prague, Czech Republic, 21 Aug. 25, 2017,total 11 pages.
Huawei et al.:"Beam measurement and reporting",3GPP Draft; R1-1717301,Oct. 8, 2017 (Oct. 8, 2017), XP051340491,total 8 pages.
3GPP TS 36.211 V13.0.0 (Dec. 2015),3rd Generation Partnership Project;Technical Specification Group Radio Access Network;Evolved Universal Terrestrial Radio Access (E-UTRA); Physical channels and modulation(Release 13), total 142 pages.
3GPP TSG RAN WG1 Meeting #90 ,R1-1712997,:"Differential L1-RSRP reporting",NEC,Prague, Czech Republic, Aug. 21-25, 2017,total 5 pages.
Huawei et al.: "Beam measurement and reporting",3GPP Draft; R1-1715467,Sep. 17, 2017 (Sep. 17, 2017), XP051338935,total 10 pages.
3GPP TS 36.212 V13.0.0 (Dec. 2015),3rd Generation Partnership Project;Technical Specification Group Radio Access Network;Evolved Universal Terrestrial Radio Access (E-UTRA); Multiplexing and channel coding(Release 13), total 121 pages.
3GPP TSG RAN WG1 Meeting #90,R1-1714529:"L1 RSRP reporting for beam management",Samsung,Prague, Czechia 21th Aug. 25, 2017,total 5 pages.
CATT: "Discussion on DL beam management",3GPP Draft; R1-1707475,May 14, 2017 (May 14, 2017), XP051272683, total 12 pages.
3GPP TS 36.213 V13.0.0 (Dec. 2015),3rd Generation Partnership Project;Technical Specification Group Radio Access Network;Evolved Universal Terrestrial Radio Access (E-UTRA); Physical layer procedures(Release 13), total 326 pages.
3GPP TSG RAN WG1 Meeting NR#3,R1-1716499:"On beam grouping and reporting ",Nokia, Nokia Shanghai Bell , Nagoya, Japan, 18th Sep. 21, 2017,total 6 pages.
Huawei et al: "Beam measurement, reporting and indication",3GPP Draft; R1-1719422,Nov. 17, 2017 (Nov. 17, 2017),XP051369125,total 12 pages.
3GPP TS 36.331 V13.0.0 (Dec. 2015),3rd Generation Partnership Project;Technical Specification Group Radio Access Network;Evolved Universal Terrestrial Radio Access (E-UTRA); Radio Resource Control (RRC);Protocol specification (Release 13), total 507 pages.

* cited by examiner

| Differential beam quality indication information Y | Difference from a reference value of beam quality |
|---|---|
| 0000 | 0 * step size |
| 0001 | −1 * step size |
| 0010 | −2 * step size |
| ... | ... |
| 1110 | −14 * step size |
| 1111 | Abnormal state |

FIG. 5a

| Differential beam quality indication information Y | Difference from a beam quality reference value |
|---|---|
| 0000 | Abnormal state |
| 0001 | −1 * step size |
| 0010 | −2 * step size |
| ... | ... |
| 1110 | −14 * step size |
| 1111 | −15 * step size |

FIG. 5b

| Differential beam quality indication information Y | Difference from a beam quality reference value |
|---|---|
| 0000 | 0 * step size |
| 0001 | −1 * step size |
| 0010 | −2 * step size |
| ... | ... |
| 1110 | −14 * step size |
| 1111 | Specified value |

FIG. 5c

| Differential beam quality indication information Y | Difference from a beam quality reference value |
|---|---|
| 0000 | 0 * step size |
| 0001 | −1 * step size |
| 0010 | −2 * step size |
| ... | ... |
| 1110 | Increase an original step by 2 dB |
| 1111 | Increase an original step by −2 dB |

FIG. 5d

| Differential beam quality indication information Y | Difference from a beam quality reference value |
|---|---|
| 0000 | 0 * step size |
| 0001 | −1 * step size |
| 0010 | −2 * step size |
| ... | ... |
| 1110 | Abnormal state |
| 1111 | Beam recovery request |

FIG. 5e

| Differential beam quality indication information Y | Difference from a reference value of beam quality |
|---|---|
| 0000 | 0 * step size |
| 0001 | −1 * step size |
| 0010 | −2 * step size |
| ... | ... |
| 1110 | Specified value |
| 1111 | Abnormal state |

| Beam quality X | Range corresponding to beam quality |
|---|---|
| 0000000 | <= −140 dB |
| 0000001 | [−140, −139] |
| 0000010 | [−139, −138] |
| ... | ... |
| ... | [−45, −44] |
| ... | > −44 dB |
| ... | Reserved |
| ... | Reserved |
| 1111111 | Abnormal state |

| Beam quality X | Range corresponding to beam quality |
|---|---|
| 0000000 | <= −140 dB |
| 0000001 | [−140, −139] |
| 0000010 | [−139, −138] |
| ... | ... |
| ... | [−45, −44] |
| ... | > −44 dB |
| ... | Reserved |
| 1111110 | Beam recovery request |
| 1111111 | Abnormal state |

FIG. 10b

COMMUNICATION METHOD AND APPARATUS FOR INDICATING BEAM QUALITY

CROSS-REFERENCE TO RELATED APPLICATIONS

This application is a continuation of International Application No. PCT/CN2018/115626, filed on Nov. 15, 2018 which claims priority to Chinese Patent Application No. 201711146689.9, filed on Nov. 17, 2017, The disclosures of the aforementioned applications are hereby incorporated by reference in their entireties.

TECHNICAL FIELD

This disclosure relates to the field of communications technologies, and in particular, to beam quality reporting.

BACKGROUND

In a new radio (NR) communications system, a beam is used for transmission, that is, a higher antenna array gain can be implemented by sending a signal in a specific direction in space. After receiving a reference signal sent by a base station, a terminal device should report beam quality of the received reference signal, to implement beam alignment.

Currently, beam quality is reported in a manner of reporting a reference value and differential beam quality. However, the current reporting manner has the following problems:

In one embodiment, as shown in FIG. 1 that is a schematic diagram of an indication manner of differentially reporting beam quality in the prior art, if some beam quality in beam quality that actually should be reported is greater than a threshold but less than a minimum value of differential beam quality, the beam quality should be reported. However, the beam quality cannot be quantized in a differential range and cannot be reported, and the base station cannot obtain accurate beam quality.

In another embodiment, as shown in FIG. 2 that is a schematic diagram of another indication manner of differentially reporting beam quality in the prior art, differential indication information of beam quality in an interval 1 and an interval 2 is the same, but beam quality lower than a threshold should not be reported. In this case, a network device cannot obtain accurate beam quality.

Therefore, how to accurately report beam quality is an urgent problem to be resolved.

SUMMARY

This disclosure provides a communication method and apparatus, to accurately report beam quality.

One embodiment of this disclosure provides a communication method. The method includes: receiving, by a terminal device, a reference signal sent by a network device; measuring, by the terminal device, the reference signal to obtain at least one piece of beam quality; and reporting, by the terminal device, specified differential beam quality indication information to the network device, where the specified differential beam quality indication information is used to indicate that beam quality reporting is abnormal, and/or the specified differential beam quality indication information is used to indicate that beam quality corresponding to the specified differential beam quality indication information is a specified value. In this embodiment, the specified differential beam quality indication information is used to indicate that beam quality reporting is abnormal or indicate that beam quality is a specified value, so that beam quality can be accurately reported.

In one embodiment, the reporting, by the terminal device, specified differential beam quality indication information to the network device includes: reporting, by the terminal device, the specified differential beam quality indication information to the network device if beam quality in the at least one piece of beam quality is greater than the specified value and less than a minimum value of beam quality in a differential range, where the specified differential beam quality indication information is used to indicate that beam quality reporting is abnormal. In another possible implementation, the reporting, by the terminal device, specified differential beam quality indication information to the network device includes:

reporting, by the terminal device, the specified differential beam quality indication information to the network device if beam quality corresponding to differential beam quality indication information is less than the specified value, where the specified differential beam quality indication information is used to indicate that the beam quality corresponding to the specified differential beam quality indication information is the specified value.

In one embodiment, the method further includes: reporting, by the terminal device, indication information of a reference value of beam quality in the at least one piece of beam quality to the network device. In this implementation, the terminal device performs differential reporting and reports indication information of measured reference value of beam quality, thereby reducing signaling overheads. The reference value is a maximum value of a plurality of pieces of beam quality obtained through measurement.

One embodiment of this disclosure provides a communication method. The method includes: sending, by a network device, a reference signal to a terminal device; and receiving, by the network device, specified differential beam quality indication information reported by the terminal device, where the specified differential beam quality indication information is used to indicate that beam quality reporting is abnormal, and/or the specified differential beam quality indication information is used to indicate that beam quality corresponding to the specified differential beam quality indication information is a specified value. In this aspect, the terminal device indicates, by using the specified differential beam quality indication information, that beam quality reporting is abnormal or that beam quality is a specified value, so that the network device can obtain accurate beam quality.

In a one embodiment, if beam quality reporting is abnormal, the method further includes: sending, by the network device, an updated differential step size to the terminal device. In this implementation, because the terminal device reports that beam quality reporting is abnormal, the network device can determine that a differential step size is set improperly. Therefore, the network device sends the updated differential step size to the terminal device, so that the terminal device can subsequently differentiate beam quality of the terminal device and report the beam quality.

In one embodiment, the method further includes: receiving, by the network device, indication information that is of a reference value of beam quality in at least one piece of measured beam quality and that is reported by the terminal device. In this implementation, the terminal device performs differential reporting and reports indication information of measured reference value of beam quality, thereby reducing signaling overheads. The reference value is a maximum value of a plurality of pieces of beam quality obtained through measurement.

With reference to one embodiment of this disclosure, in a possible implementation, if beam quality in the at least one piece of beam quality is greater than the specified value and less than a minimum value of beam quality in a difference range, beam quality reporting is abnormal. In this implementation, the beam quality that is greater than the specified value and less than the minimum value of the beam quality in the differential range should be reported. If not, beam quality reporting is abnormal.

With reference to one embodiment of this disclosure, in another possible implementation, the specified differential beam quality indication information is any one piece of differential beam quality indication information.

One embodiment of this disclosure provides a communication method. The method includes: receiving, by a terminal device, a reference signal sent by a network device; measuring, by the terminal device, the reference signal to obtain at least one piece of beam quality; and reporting, by the terminal device, differential beam quality indication information corresponding to a specified value to the network device, where beam quality corresponding to the differential beam quality indication information is less than the specified value. In this aspect, when the beam quality corresponding to the differential beam quality indication information is less than the specified value, the terminal device reports the differential beam quality indication information, and the network device determines that the beam quality corresponding to the received differential beam quality indication information is the specified value, so that beam quality is accurately reported.

One embodiment of this disclosure provides a communication method. The method includes: sending, by a network device, a reference signal to a terminal device; receiving, by the network device, differential beam quality indication information reported by the terminal device, where beam quality corresponding to the differential beam quality indication information is less than a specified value; and determining, by the network device, that the beam quality corresponding to the received differential beam quality indication information is the specified value. In this aspect, when the beam quality corresponding to the differential beam quality indication information is less than the specified value, the terminal device reports the differential beam quality indication information, and the network device determines that the beam quality corresponding to the received differential beam quality indication information is the specified value, so that beam quality is accurately reported.

One embodiment of this disclosure provides a communication method. The method includes: receiving, by a terminal device, a reference signal sent by a network device; measuring, by the terminal device, the reference signal to obtain at least one piece of beam quality; and sending, by the terminal device, specified beam quality indication information to the network device, where the specified beam quality indication information is used to indicate that beam quality reporting is abnormal. In this aspect, the specified beam quality indication information is used to indicate that beam quality reporting is abnormal, so that beam quality can be accurately reported.

One embodiment of this disclosure provides a communication method. The method includes: receiving, by a terminal device, a reference signal sent by a network device; measuring, by the terminal device, the reference signal to obtain at least one piece of beam quality; and sending, by the terminal device, specified beam quality indication information to the network device when a reference value of at least one piece of beam quality that should be reported in the at least one piece of beam quality is less than a specified value, where the specified beam quality indication information is used to indicate that beam quality reporting is abnormal.

One embodiment of this disclosure provides a communication method. The method includes: sending, by a network device, a reference signal to a terminal device; and receiving, by the network device, specified beam quality indication information reported by the terminal device, where the specified beam quality indication information is used to indicate that beam quality is abnormal. In this aspect, the specified beam quality indication information is used to indicate that beam quality reporting is abnormal, so that the network device can obtain accurate beam quality.

One embodiment of this disclosure provides a communication method. The method includes: sending, by a network device, a reference signal to a terminal device; and receiving, by the network device, specified beam quality indication information reported by the terminal device when a reference value of at least one piece of beam quality that should be reported in at least one piece of beam quality is less than a specified value, where the specified beam quality indication information is used to indicate that beam quality reporting is abnormal.

With reference to one embodiment of this disclosure, in a possible implementation, if beam quality reference value obtained by the terminal device through measurement at a measurement time is less than the specified value, beam quality reporting is abnormal. In this implementation, a case in which a reference value of beam quality is less than the specified value is an abnormal case, and also should be reported to the network device.

One embodiment of this disclosure provides a communication method. The method includes: receiving, by a terminal device, a reference signal sent by a network device; measuring, by the terminal device, the reference signal to obtain at least one piece of beam quality, and determining a reference value of beam quality in the at least one piece of beam quality; and determining, by the terminal device, a differential step size of differential beam quality based on a specified value and the reference value of beam quality. In this implementation, the terminal device determines the differential step size based on the specified value and the reference value of beam quality measured by the terminal device, so that beam quality of the terminal device can be properly differentiated.

In one embodiment, the method further includes: sending, by the terminal device, the differential step size to the network device. In this implementation, the terminal device may send the determined differential step size to the network device. In an alternative manner, the network device may alternatively calculate the differential step size based on the reference value of beam quality reported by the terminal device.

In one embodiment, the method further includes: sending, by the terminal device, indication information of the reference value of the beam quality and indication information of at least one piece of differential beam quality to the network device.

One embodiment of this disclosure provides a communication method. The method includes: sending, by a network device, a reference signal to a terminal device; and receiving, by the network device, indication information of a reference value of beam quality and indication information of at least one piece of differential beam quality that are reported by the terminal device, and determining a differential step size for beam quality differentiation. In this aspect, the terminal device determines the differential step size based on a specified value and the reference value of beam quality measured by the terminal device, so that beam quality of the terminal device can be properly differentiated and the beam quality can be reported, and the network device can obtain accurate beam quality.

In one embodiment, the differential step size is: Differential step size=(Reference value of beam quality−Specified value)/($2^N$); or Differential step size=(Reference value of beam quality−Specified value)/($2^N$−1); or Differential step size=(Reference value of beam quality−Specified value)/($2^N$−2). N is an information bit quantity of differential beam quality indication information. In this implementation, it may be considered that one or two pieces of beam indication information may be reserved to indicate that beam quality reporting is abnormal or beam quality is a specified value, or may not be reserved.

One embodiment of this disclosure provides a communications apparatus, and the communications apparatus can implement the communication methods. For example, the communications apparatus may be a chip (such as a baseband chip or a communications chip) or a device (such as a terminal device). The foregoing methods may be implemented by using software, hardware, or hardware executing corresponding software. In a possible implementation, a processor and a memory are included in a structure of the communications apparatus. The processor is configured to support the apparatus in performing a corresponding function in the foregoing communication methods. The memory is configured to be coupled to the processor, and the memory stores a necessary program (instruction) and/or data of the apparatus. Optionally, the communications apparatus may further include a communications interface, configured to support communication between the apparatus and another network element.

In one embodiment, the communications apparatus may include a receiving unit, a processing unit, and a sending unit. The receiving unit, the processing unit, and the sending unit are separately configured to implement receiving, processing, and sending functions in the foregoing methods. For example, the receiving unit is configured to receive a reference signal sent by a network device; the processing unit is configured to measure the reference signal to obtain at least one piece of beam quality; and the sending unit is configured to report specified differential beam quality indication information to the network device. For another example, the receiving unit is configured to receive a reference signal sent by a network device; the processing unit is configured to measure the reference signal to obtain at least one piece of beam quality; and the sending unit is configured to report differential beam quality indication information corresponding to a specified value to the network device. For another example, the receiving unit is configured to receive a reference signal sent by a network device; the processing unit is configured to measure the reference signal to obtain at least one piece of beam quality; and the sending unit is configured to send specified beam quality indication information to the network device. For another example, the receiving unit is configured to receive a reference signal sent by a network device; and the processing unit is configured to: measure the reference signal to obtain at least one piece of beam quality, determine a reference value of beam quality in the at least one piece of beam quality, and determine a differential step size of differential beam quality based on a specified value and the reference value of beam quality.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver (or may be referred to as a receiver); and the sending unit may be a transmitter (or may be referred to as a transmitter).

One embodiment of this disclosure provides a communications apparatus, and the communications apparatus can implement the communication methods. For example, the communications apparatus may be a chip (such as a baseband chip or a communications chip) or a device (such as a network device or a baseband board). The foregoing methods may be implemented by using software, hardware, or hardware executing corresponding software.

In one embodiment, a processor and a memory are included in a structure of the communications apparatus. The processor is configured to support the apparatus in performing a corresponding function in the foregoing communication methods. The memory is configured to be coupled to the processor, and the memory stores a necessary program (instruction) and/or data of the apparatus. Optionally, the communications apparatus may further include a communications interface, configured to support communication between the apparatus and another network element.

In one embodiment, the communications apparatus may include a sending unit and a receiving unit. The receiving unit and the sending unit are separately configured to implement receiving and sending functions in the foregoing methods. For example, the sending unit is configured to send a reference signal to a terminal device; and the receiving unit is configured to receive specified differential beam quality indication information reported by the terminal device. For another example, the sending unit is configured to send a reference signal to a terminal device; and the receiving unit is configured to receive specified beam quality indication information reported by the terminal device. The communications apparatus may further include a processing unit. For another example, the sending unit is configured to send a reference signal to a terminal device; the receiving unit is configured to receive indication information of a reference value of beam quality reported by the terminal device and indication information of at least one piece of differential beam quality; and the processing unit is configured to determine a differential step size for beam quality differentiation.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver (or may be referred to as a receiver); and the sending unit may be a transmitter (or may be referred to as a transmitter).

One embodiment of this disclosure provides a computer-readable storage medium. The computer-readable storage medium stores an instruction. When the instruction is run on a computer, the computer is enabled to perform the methods according to the foregoing aspects.

One embodiment of this disclosure provides a computer program product including an instruction. When the computer program product is run on a computer, the computer is enabled to perform the methods according to the foregoing aspects.

BRIEF DESCRIPTION OF DRAWINGS

To describe the technical solutions in the embodiments of this disclosure or in the background more clearly, the following describes the accompanying drawings required by the embodiments of this disclosure or the background.

FIG. 5a to FIG. 5e are schematic diagrams of an example of an indication manner of differentially reporting beam quality according to an embodiment of this disclosure.

FIG. 9 is a schematic interaction flowchart of still another communication method according to an embodiment of this disclosure.

FIG. 10a and FIG. 10b are schematic diagrams of an example of an indication manner of reporting beam quality according to an embodiment of this application;

DESCRIPTION OF EMBODIMENTS

The following describes the embodiments of this disclosure with reference to the accompanying drawings in the embodiments of this disclosure.

Figure 3:
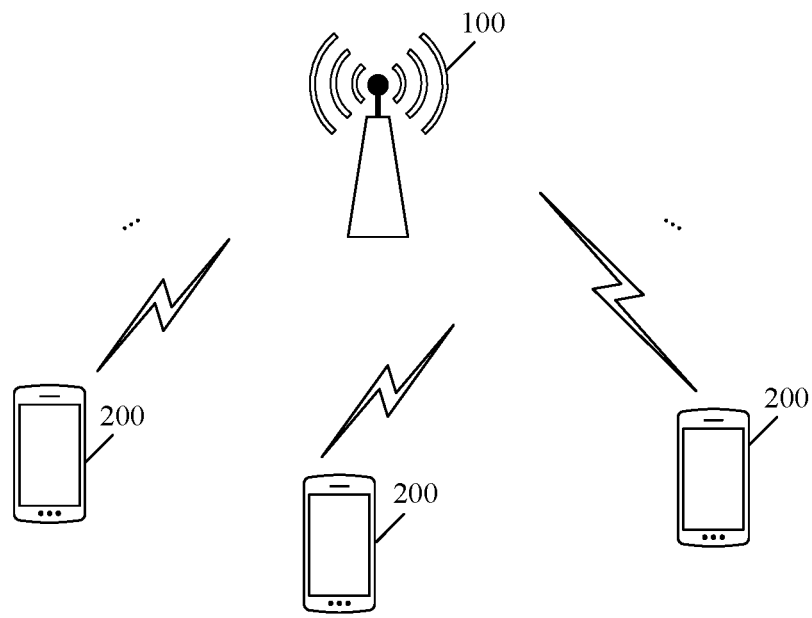
FIG. 3 is a schematic diagram of a communications system according to an embodiment of this disclosure.

FIG. 3 is a schematic diagram of a communications system. The communications system may include at least one network device 100 (only one is shown) and one or more terminal devices 200 connected to the network device 100.

The network device 100 may be a device that can communicate with the terminal device 200. The network device 100 may be any device with a wireless transceiver function. The network device 100 includes but is not limited to a base station (for example, a NodeB, an eNodeB, a base station in a fifth generation (5G) communications system, a base station or a network device in a future communications system, an access node in a Wi-Fi system, a wireless relay node, or a wireless backhaul node), and the like. The network device 100 may alternatively be a radio controller in a cloud radio access network (CRAN) scenario. The network device 100 may alternatively be a network device in a 5G network or a network device in a future evolved network, or may be a wearable device, a vehicle-mounted device, or the like. The network device 100 may alternatively be a small cell, a transmission node, transmission point (TP), or the like. Certainly, this disclosure is not limited thereto.

The terminal device 200 is a device that has a wireless transceiver function and may be deployed on land. The terminal device 200 includes an indoor or outdoor device, a handheld device, a wearable device, or a vehicle-mounted device. The terminal device 200 can also be deployed on the water surface (for example, a ship) or in the air (for example, on aircraft, balloons, satellites, and the like). The terminal device may be a mobile phone, a tablet (Pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, and the like. An application scenario is not limited in the embodiments of this disclosure. Sometimes, the terminal device may also be referred to as user equipment (UE), an access terminal device, a UE unit, a UE station, a mobile station, a mobile console, a remote station, a remote terminal device, a mobile device, a UE terminal device, a terminal device, a wireless communications device, a UE agent, a UE apparatus, or the like.

It should be noted that, terms "system" and "network" in this embodiment of this disclosure may be used interchangeably. "A plurality of" means two or more. In view of this, "a plurality of" may also be understood as "at least two" in the embodiments of this disclosure. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Figure 4:
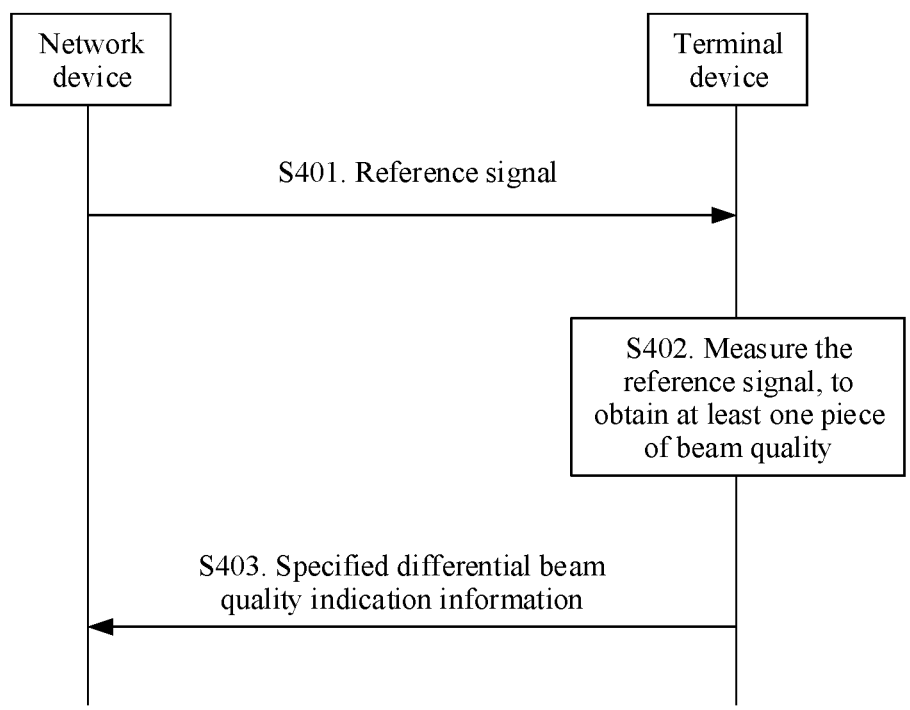
FIG. 4 is a schematic interaction flowchart of a communication method according to an embodiment of this disclosure.

FIG. 4 is a schematic interaction flowchart of a communication method according to an embodiment of this disclosure. The method may include the following blocks.

S401. A network device sends a reference signal to a terminal device. The terminal device receives the reference signal sent by the network device.

S402. The terminal device measures the reference signal to obtain at least one piece of beam quality.

S403. The terminal device reports specified differential beam quality indication information to the network device. The network device receives the specified differential beam quality indication information. The specified differential beam quality indication information is used to indicate that beam quality reporting is abnormal, or the specified differential beam quality indication information is used to indicate that beam quality corresponding to the specified differential beam quality indication information is a specified value.

The network device may send the reference signal to the terminal device at an irregular time or a regular time, to obtain beam quality of the terminal device, and perform beam management. The reference signal may be a channel status information-reference signal (CSI-RS), a sounding reference signal (SRS), or the like. The terminal device receives the reference signal by using one or more beams, and measures the reference signal to obtain quality of the one or more beams. Beam quality is measured in a plurality of manners, including measuring reference signal receiving power (RSRP), reference signal receiving quality (RSRQ), a signal to interference plus noise ratio (SINR), and the like.

After obtaining the beam quality through measurement, the terminal device should report the measured quality of one or more beams to the network device. The terminal device reports indication information of a reference value of beam quality and indication information of differential beam quality. For example, the RSRP ranges from −140 dBm to −44 dBm. The reference value of beam quality is a maximum value of a plurality of pieces of actually measured beam quality. A beam quality range measured each time and the reference value of beam quality may be different. The reference value of beam quality is generally reported by using 7-bit indication information. 7 bits may correspond to 128 pieces of indication information, where −140 dBm to −44 dBm occupy 97 pieces of indication information in total, and remaining indication information may be reserved for other purposes. Each piece of indication information corresponds to a small beam quality range. Differential beam quality is generally reported by using 4-bit indication information. Four bits may correspond to 16 pieces of indication information, and each piece of indication information corresponds to one differential step size (stepsize). The network device may deduce, with reference to a known differential step size, a specific value of each piece of beam quality reported by the terminal device by obtaining the reference value of beam quality and differential beam quality indication information. For example, if a reference value of the RSRP is −85 dBm, and a differential step size is −2 dBm, RSRP corresponding to indication information "0001" is −87 dBm, RSRP corresponding to indication information "0010" is −89 dBm, and so on.

As described in a standard proposal:

Followed by using a configured step size, there is still one remaining issue on 4-bit differential reporting, which is, how UE can report those RSRPs which are larger than a configured lower limit (means that they should be reported) and are smaller than the lowest possible value that a 4-bit differential state plus a 7-bit absolute state can represent (means that they cannot be reported accurately by the 4-bit differential reporting). A simple illustration is as follows.

One solution is to reserve one out of 16 states in 4-bit different RSRP reporting for the abnormal case, as in the next table. So that gNB can be aware that the configured step size is not suitable and it may send a new configuration to UE.

Proposal: Support to reserve at least one state in 4-bit differential RSRP reporting for the abnormality.

As described above, in a scenario, there is still a problem about 4-bit differential reporting by using a configured differential step size, that is, how the terminal device reports those beam quality values that are greater than a configured lower value (which means that the terminal device should report these beam quality values) and less than a possible lowest value represented by 4-bit differential indication information and a 7-bit absolute value (which means that those beam quality values cannot be accurately reported by using the 4-bit differential indication information). For example, if a reference value of the RSRP is −85 dBm, and a differential step size is −2 dBm, RSRP corresponding to the sixteenth piece of differential indication information is −107 dBm, and a specified value is −115 dBm. However, actually measured beam quality is −85 dBm to −110 dBm. In this case, beam quality of −108 dBm to −110 dBm cannot be differentially quantized. In the solution of this embodiment, one piece of indication information is reserved in the 16 pieces of indication information corresponding to 4-bit differential beam quality reporting, and is used to indicate abnormal indication information, to indicate that beam quality to be reported is out of a range. In this case, the network device can be aware that a step size is inappropriate, and then send a newly configured step size to the terminal device. Therefore, it is proposed that at least one piece of indication information can be reserved in the 4-bit differential beam quality indication information for reporting abnormal indication information.

Specifically, S403 specifically includes: reporting, by the terminal device, specified differential beam quality indication information to the network device if beam quality in the at least one piece of beam quality is greater than a specified value and less than a minimum value of beam quality in a differential range, where the specified differential beam quality indication information is used to indicate that beam quality reporting is abnormal. If beam quality in the at least one piece of beam quality is greater than the specified value and less than the minimum value of the beam quality in the difference range, beam quality reporting is abnormal. The beam quality that is greater than the specified value and less than the minimum value of the beam quality in the differential range should be reported. If not, beam quality reporting is abnormal. The specified value may also be referred to as a reporting threshold. FIG. 5a is a schematic diagram of an example of an indication manner of differentially reporting beam quality according to an embodiment of this disclosure. In this example, one piece of differential indication information is reserved to indicate an abnormal state, that is, differential indication information "1111" in 4 bits is set to correspond to the abnormal state. If the terminal device finds, when reporting beam quality and differentiating the beam quality, that some beam quality is greater than the specified value and less than the minimum value of the beam quality in the difference range, the terminal device reports the indication information "1111" to the network device. After receiving the indication information "1111" reported by the terminal device, the network device may determine that beam quality reporting of the terminal device is abnormal. It should be noted that the specified differential beam quality indication information is used to indicate that beam quality reporting is abnormal, and this is reporting in a special case. In a normal case, for reporting of beam quality indication information, refer to the prior art.

The reference value of beam quality and the specified differential beam quality indication information may be reported by using a media access control-control element (MAC-CE), uplink control information (UCI), or UCI carried in a physical uplink shared channel (PUSCH), or by directly encapsulating the reference value and the indication information into data or another format.

Using the UCI as an example, a reporting format may be the following format 1 or format 2:

Format 1:

| Field | Bit width |
| --- | --- |
| Beam number 1 | [6] |
| Reference value of beam quality | 7 |
| Beam number 2 | [6] |
| Differential beam quality 1 | 4 |

In the format 1, one beam number, one beam quality reference value, one beam number, and one piece of differential beam quality are separately reported. The table uses an example in which two pieces of beam quality is fed back. If more beam quality should be fed back, the rest may be deduced by analogy. [6], 7, and 4 are bit sizes, and a bit size represented by [ ] is a variable value.

Format 2:

| Field | Bit width |
|---|---|
| Beam number 1 | [6] |
| Beam number 2 | [6] |
| Reference value of beam quality | 7 |
| Differential beam quality 1 | 4 |

In the format 2, all beam numbers, all beam quality reference values, or differential beam quality are separately reported. The table uses an example in which two pieces of beam quality is fed back. If more beam quality should be fed back, the rest may be deduced by analogy. [6], 7, and 4 are bit sizes, and a bit size represented by [ ] is a variable value.

It should be noted that the specified differential beam quality indication information may be any one piece of the differential beam quality indication information, that is, "1111" may be used to correspond to the abnormal state, or any one of the other 15 pieces of indication information may be used to correspond to the abnormal state.

Because the terminal device reports that beam quality reporting is abnormal, the network device can determine that the differential step size is set improperly. Therefore, further, the method further includes: sending, by the network device, an updated differential step size to the terminal device. The terminal device receives the updated differential step size. In this way, subsequently, the terminal device can properly differentiate beam quality of the terminal device and report the beam quality.

Figure 1:
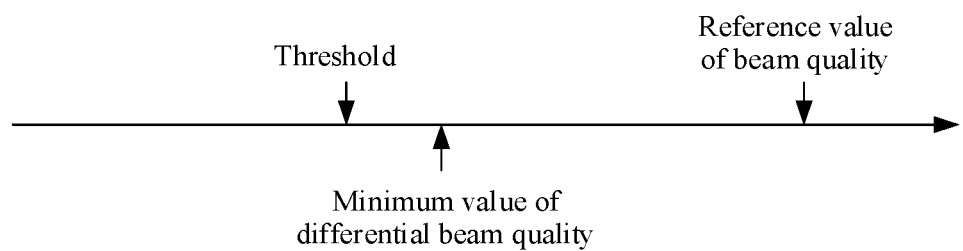
FIG. 1 is a schematic diagram of an indication manner of differentially reporting beam quality in the prior art.
Figure 2:
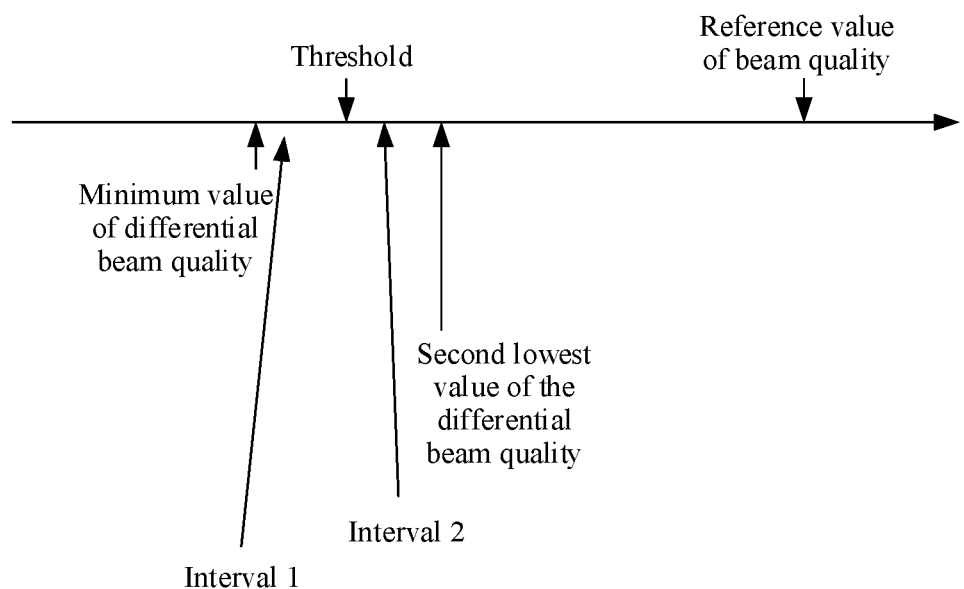
FIG. 2 is a schematic diagram of another indication manner of differentially reporting beam quality in the prior art.

As described above, in another scenario, as shown in FIG. 2, differential indication information of beam quality in an interval 1 and an interval 2 is the same, but beam quality lower than a threshold should not be reported. In this case, the network device cannot obtain accurate beam quality. In this embodiment, the terminal device reports one piece of specified differential beam quality indication information to the network device. Where the specified differential beam quality indication information is used to indicate that beam quality corresponding to the specified differential beam quality indication information is a specified value. S403 specifically includes: reporting, by the terminal device, specified differential beam quality indication information to the network device if beam quality corresponding to differential beam quality indication information is less than a specified value, where the specified differential beam quality indication information is used to indicate that beam quality corresponding to the specified differential beam quality indication information is the specified value.

In an alternative indication manner of differentially reporting beam quality shown in FIG. 5a, other indication information may be used to indicate that beam quality reporting is abnormal. For example, in FIG. 5c, "0000" is used to indicate that beam quality reporting is abnormal.

Specifically, FIG. 5c is a schematic diagram of an example of still another indication manner of differentially reporting beam quality according to an embodiment of this disclosure. In this example, one piece of differential indication information is reserved to indicate that beam quality corresponding to the differential indication information is a specified value, that is, differential indication information "1111" in 4 bits is set to correspond to the specified value. The terminal device reports differential beam quality indication information "1111" corresponding to the interval 2 to the network device. After receiving the indication information "1111" reported by the terminal device, the network device may determine that beam quality corresponding to the indication information is the specified value. In this case, the terminal device does not report beam quality less than the specified value, so that the network device can obtain accurate beam quality. It should be noted that the specified differential beam quality indication information may be any one piece of the differential beam quality indication information, that is, "1111" may be used to correspond to the specified value, or any one of the other 15 pieces of indication information may be used to correspond to the specified value.

FIG. 5d is a schematic diagram of an example of still another indication manner of differentially reporting beam quality according to an embodiment of this disclosure. In this example, one or two pieces of differential indication information are reserved to indicate a differential step size recommended by the terminal device. For example, in FIG. 5d, it is assumed that a step size configured by the network device is 3 dB, and the terminal device recommends that the step size should be increased or decreased by 2 dB. If the terminal device reports "1110", "1110" is used to indicate that the step size should be increased by 2 dB, or reports "1111", and "1111" is used to indicate that the step size should be decreased by 2 dB.

FIG. 5e is a schematic diagram of an example of still another indication manner of differentially reporting beam quality according to an embodiment of this disclosure. In this example, one piece of indication information is reserved to indicate that beam quality reporting is abnormal, and another piece of indication information is reserved to send a beam recovery request. As shown in FIG. 5e, "1110" is used to indicate that beam quality reporting is abnormal, and "1111" is used to send a beam recovery request.

Certainly, the terminal device may not report the specified differential beam quality indication information only, but may also report another piece of differential beam quality indication information. The another piece of differential beam quality indication information corresponds to another beam quality value, and the specified differential beam quality indication information corresponds to a beam quality value in some intervals.

Further, the method further includes: reporting, by the terminal device, indication information of a reference value of beam quality in the at least one piece of beam quality to the network device. The network device receives the indication information of the reference value of beam quality. The terminal device reports the indication information of the measured reference value of beam quality, and differentially reports other measured beam quality, thereby reducing signaling overheads.

According to a communication method provided in this embodiment of this disclosure, the specified differential beam quality indication information is used to indicate that beam quality reporting is abnormal or indicate that beam quality is a specified value, so that beam quality can be accurately reported.

Figures 6, 7:
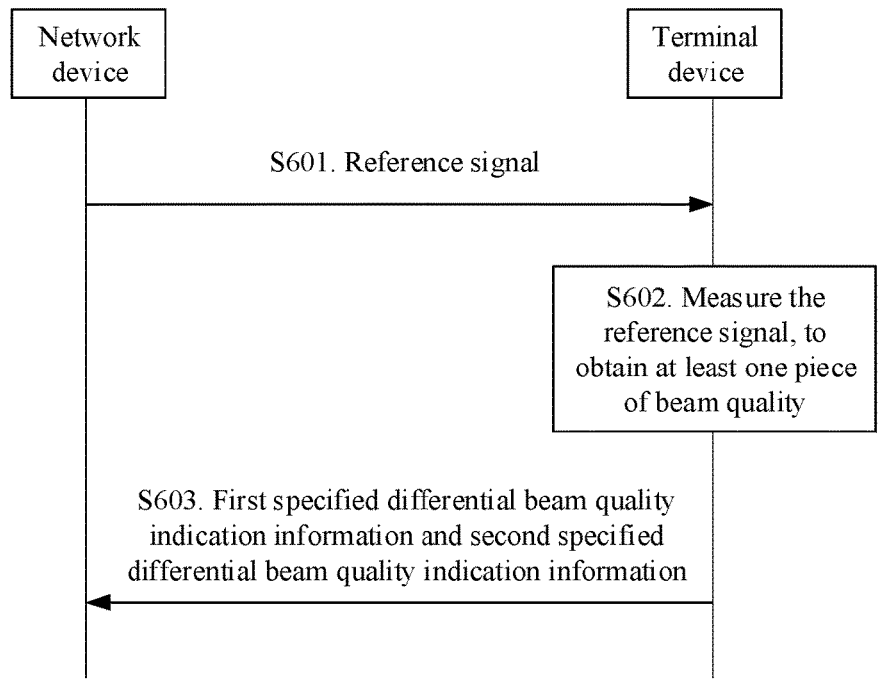
FIG. 6 is a schematic interaction flowchart of another communication method according to an embodiment of this disclosure.
FIG. 7 is a schematic diagram of an example of still another indication manner of differentially reporting beam quality according to an embodiment of this disclosure.

FIG. 6 is a schematic interaction flowchart of another communication method according to an embodiment of this disclosure. The method may include the following blocks.

S601. A network device sends a reference signal to a terminal device. The terminal device receives the reference signal sent by the network device.

S602. The terminal device measures the reference signal to obtain at least one piece of beam quality.

S603. The terminal device reports first specified differential beam quality indication information and second specified differential beam quality indication information to the network device. The network device receives the first specified differential beam quality indication information and the second specified differential beam quality indication information. The first specified differential beam quality indication information is used to indicate that beam quality reporting is abnormal, and the second specified differential beam quality indication information is used to indicate that beam quality corresponding to the specified differential beam quality indication information is a specified value.

A difference between this embodiment and the embodiment shown in FIG. 4 is that two pieces of specified differential beam quality indication information are set, that is, the first specified differential beam quality indication information is used to indicate that beam quality reporting is abnormal, and the second specified differential beam quality indication information is used to indicate that beam quality is a specified value. Specifically, FIG. 7 is a schematic diagram of an example of another indication manner of differentially reporting beam quality according to an embodiment of this disclosure. Indication information "1110" is set to correspond to that the beam quality is the specified value, and indication information "1111" is set to correspond to the abnormal state. The terminal device reports the two pieces of indication information to the network device. When receiving the two pieces of indication information, the network device may determine that beam quality reporting is abnormal, and the beam quality corresponding to "1110" is the specified value. It should be noted that the first specified differential beam quality indication information and the second specified differential beam quality indication information may separately be any piece of differential beam quality indication information.

According to a communication method provided in this embodiment of this disclosure, the first specified differential beam quality indication information is used to indicate that beam quality reporting is abnormal, and the second specified differential beam quality indication information is used to indicate that the beam quality is a specified value, so that beam quality can be accurately reported.

Figure 8:
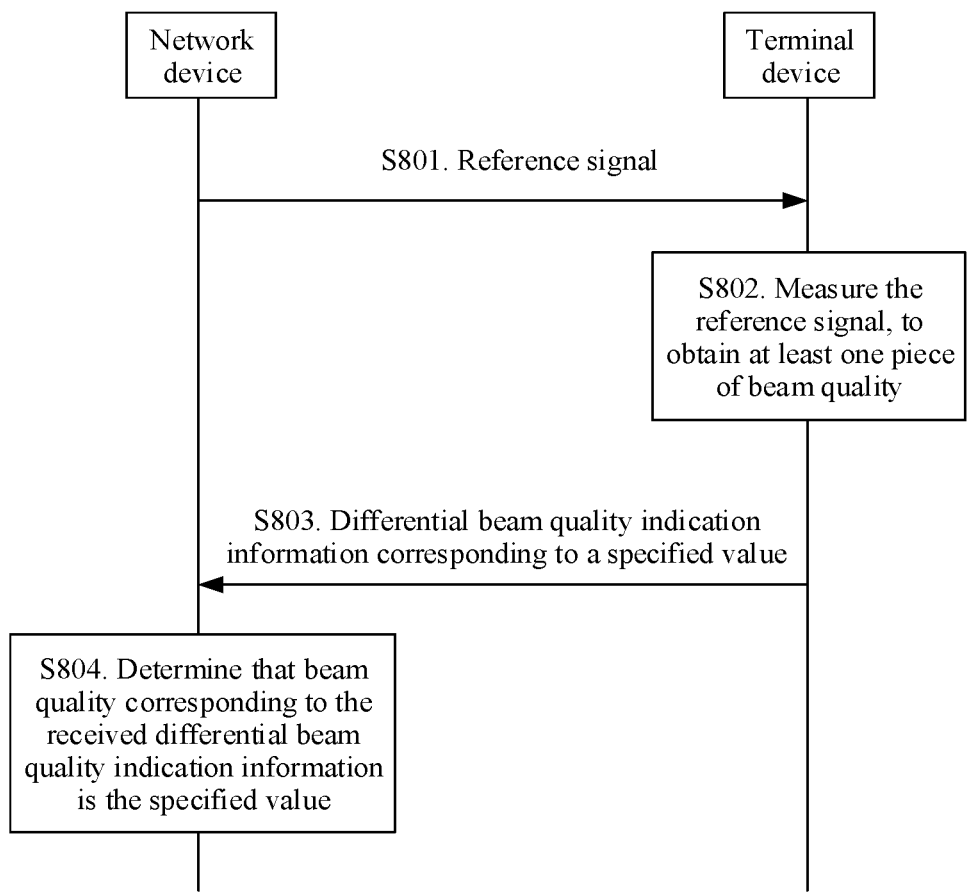
FIG. 8 is a schematic interaction flowchart of still another communication method according to an embodiment of this disclosure.

FIG. 8 is a schematic interaction flowchart of still another communication method according to an embodiment of this disclosure. The method may include the following blocks.

S801. A network device sends a reference signal to a terminal device. The terminal device receives the reference signal sent by the network device.

S802. The terminal device measures the reference signal to obtain at least one piece of beam quality.

S803. The terminal device reports differential beam quality indication information corresponding to a specified value to the network device, where beam quality corresponding to the differential beam quality indication information is less than the specified value. The network device receives the differential beam quality indication information reported by the terminal device.

S804. The network device determines that the beam quality corresponding to the received differential beam quality indication information is the specified value.

As described above, in FIG. 2, differential indication information of beam quality in an interval 1 and an interval 2 is the same, but beam quality lower than a threshold should not be reported. In this case, the network device cannot obtain accurate beam quality. In this embodiment, accurate beam quality is reported by defining behavior of the terminal device, and accurate beam quality is obtained by defining behavior of the network device.

Specifically, the terminal device should not report the beam quality corresponding to the interval 1, but should report the beam quality corresponding to the interval 2. The differential indication information of the interval 1 is the same as that of the interval 2. In this embodiment, the beam quality corresponding to the differential beam quality indication information is defined as the specified value. Specifically, the terminal device reports the differential beam quality indication information, and the network device determines that the beam quality corresponding to the received differential beam quality indication information is the specified value.

According to a communication method provided in this embodiment of this disclosure, when the beam quality corresponding to the differential beam quality indication information is less than the specified value, the terminal device reports the differential beam quality indication information, and the network device determines that the beam quality corresponding to the received differential beam quality indication information is the specified value, so that beam quality is accurately reported.

Figures 9, 10A:
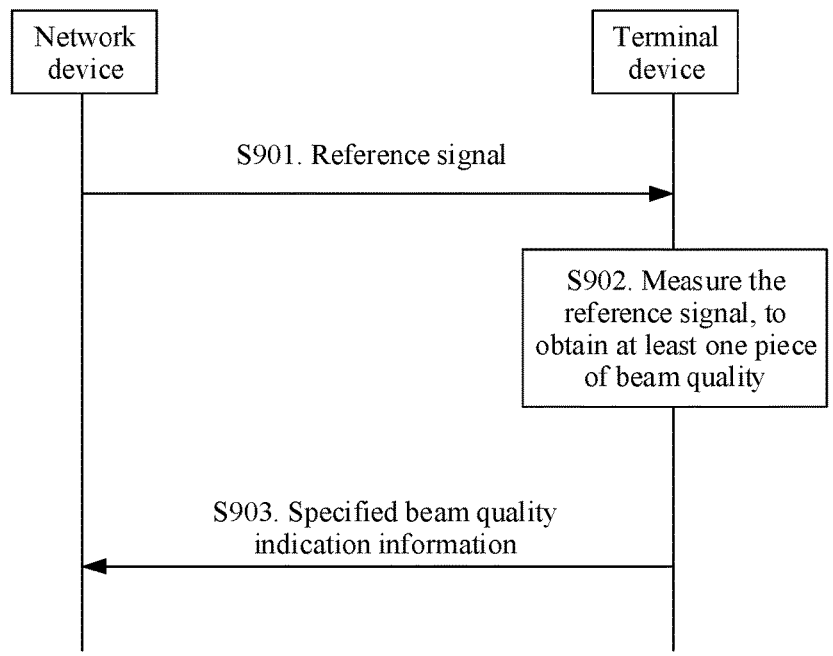

FIG. 9 is a schematic interaction flowchart of still another communication method according to an embodiment of this disclosure. The method may include the following blocks.

S901. A network device sends a reference signal to a terminal device. The terminal device receives the reference signal sent by the network device.

S902. The terminal device measures the reference signal to obtain at least one piece of beam quality.

S903. The terminal device sends specified beam quality indication information to the network device. The network device receives the specified beam quality indication information. The specified beam quality indication information is used to indicate that the beam quality reporting is abnormal.

If a reference value of beam quality obtained by the terminal device through measurement at a measurement time is less than a specified value, the beam quality reporting is abnormal. A case in which the reference value of beam quality is less than the specified value is an abnormal case, and also should be reported to the network device.

Specifically, FIG. 10*a* is a schematic diagram of an example of an indication manner of reporting beam quality according to an embodiment of this disclosure. RSRP is used as an example. In this embodiment, RSRP measured by the terminal device is not within a range from −140 dBm to −44 dBm. In other words, a reference value of the RSRP is less than −140 dBm, and the terminal device cannot report the reference value of the RSRP by using any piece of beam quality indication information. Therefore, in this embodiment, any piece of reserved indication information in 7-bit beam quality indication information is set to indicate the abnormal state. For example, in FIG. 10*a*, indication information "1111111" is set to indicate the abnormal state. When receiving the indication information, the network device may determine that beam quality reporting is abnormal, that is, the reference value of beam quality obtained by the terminal device through measurement at the measurement time is less than the specified value.

FIG. 10*b* is a schematic diagram of an example of another indication manner of reporting beam quality according to an embodiment of this disclosure. In this example, one piece of indication information is reserved to indicate that beam quality reporting is abnormal, and another piece of indication information is reserved to send a beam recovery request. As shown in FIG. 10*b*, "1111111" is used to indicate that beam quality reporting is abnormal, and "1111110" is used to send a beam recovery request. According to a communication method provided in this embodiment of this disclosure, the specified beam quality indication information is used to indicate that beam quality reporting is abnormal, so that beam quality can be accurately reported.

Figure 11:
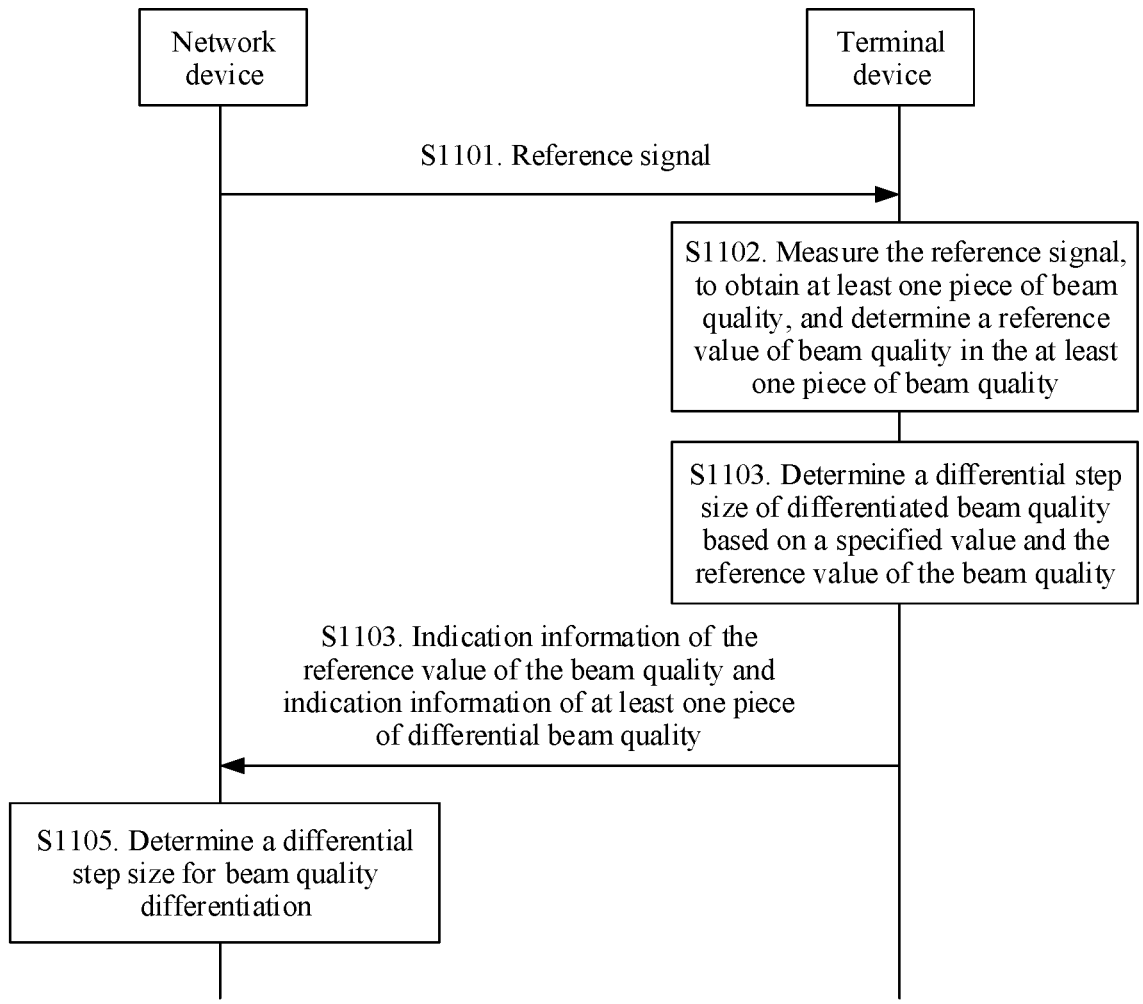
FIG. 11 is a schematic interaction flowchart of still another communication method according to an embodiment of this disclosure.

FIG. 11 is a schematic interaction flowchart of still another communication method according to an embodiment of this disclosure. The method may include the following blocks.

S1101. A network device sends a reference signal to a terminal device. The terminal device receives the reference signal sent by the network device.

S1102. The terminal device measures the reference signal to obtain at least one piece of beam quality, and determines a reference value of beam quality in the at least one piece of beam quality.

S1103. The terminal device determines a differential step size of differential beam quality based on a specified value and the reference value of beam quality.

S1104. The terminal device sends indication information of the reference value of beam quality and indication information of at least one piece of differential beam quality to the network device. The network device receives the indication information of the reference value of beam quality and the indication information of the at least one piece of differential beam quality that are reported by the terminal device.

S1105. The network device determines a differential step size for beam quality differentiation.

In the foregoing embodiment, the differential step size is configured by the network device. In this embodiment, the terminal device determines the differential step size of the differential beam quality based on the actually measured reference value of beam quality and a configured specified value.

Specifically, after obtaining a plurality of pieces of beam quality through measurement, the terminal device first determines a reference value of beam quality in the plurality of pieces of beam quality, that is, a maximum value of the plurality of pieces of beam quality.

Then, the differential step size of the differential beam quality may be determined according to any one of the following formulas:

Differential step size=(Reference value of beam quality−Specified value)/($2^N$)   Formula (1) or Differential step size=(Reference value of beam quality−Specified value)/($2^N-1$)   Formula (2) or Differential step size=(Reference value of beam quality−Specified value)/($2^N-2$)   Formula (3), where N is an information bit quantity of differential beam quality indication information.

Formula (1) is a case in which indication information is not reserved. Formula (2) reserves one piece of indication information, for example, indication information used to indicate that beam quality reporting is abnormal or beam quality is a specified value. Formula (3) reserves two pieces of indication information, for example, indication information used to indicate that beam quality reporting is abnormal and indication information used to indicate that beam quality is a specified value.

Further, the method further includes: sending, by the terminal device, the differential step size to the network device. In this implementation, the terminal device may send the determined differential step size to the network device.

In an alternative manner, the network device may alternatively calculate the differential step size based on the reference value of beam quality reported by the terminal device.

Then, the network device receives the indication information of the reference value of beam quality and the indication information of the at least one piece of differential beam quality that are reported by the terminal device, to obtain all beam quality that should be reported.

According to a communication method provided in this embodiment of this disclosure, the terminal device determines the differential step size based on the specified value and the reference value of beam quality measured by the terminal device, so that the beam quality of the terminal device can be properly differentiated.

The methods in the embodiments of this disclosure are described in detail above, and apparatuses in the embodiments of the present disclosure are provided below.

Figure 12:
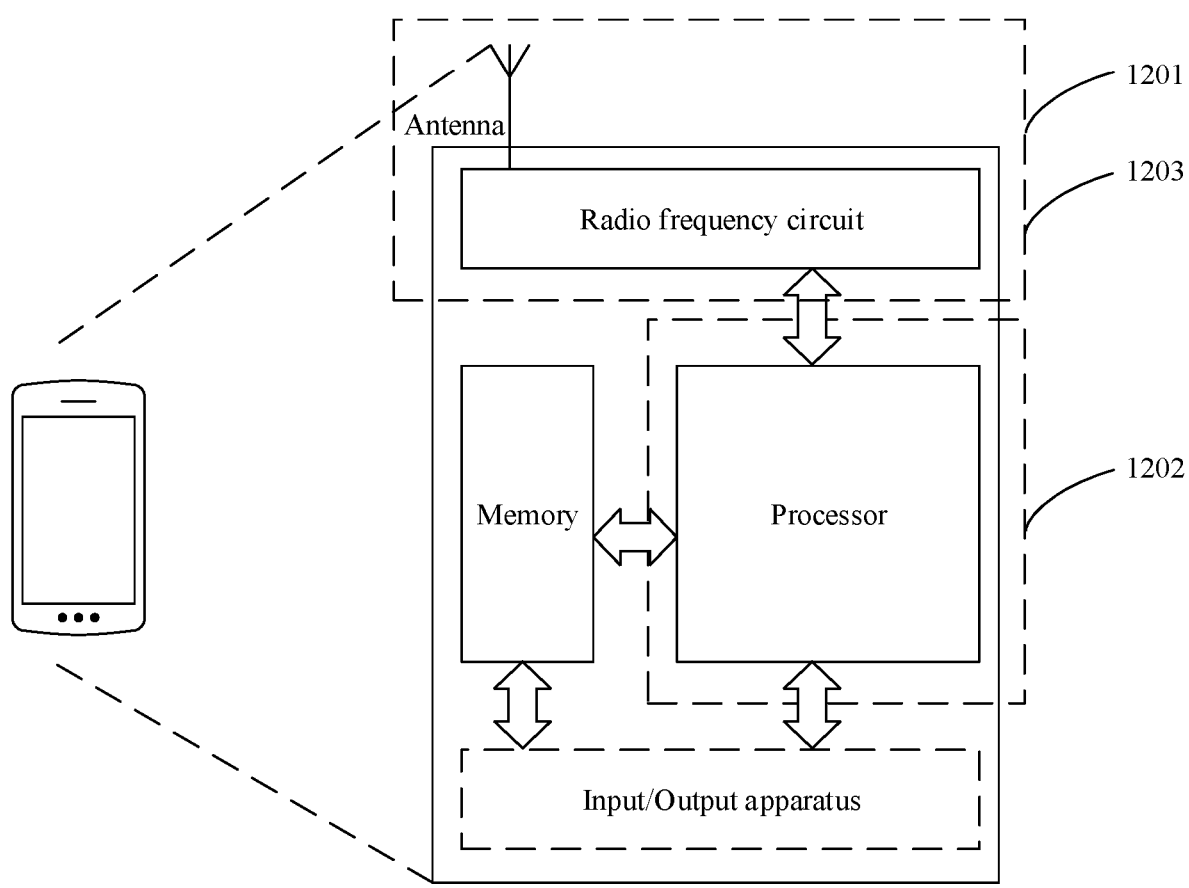
FIG. 12 is a schematic diagram of a simplified hardware architecture of a terminal device according to an embodiment of this disclosure.

FIG. 12 is a schematic diagram of a simplified structure of a terminal device. For ease of understanding and illustration, in FIG. 12, a mobile phone is used as an example of the terminal device. As shown in FIG. 12, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal that is in an electromagnetic wave form. The input/output apparatus, such as a touchscreen, a display screen, or a keyboard, is mainly configured to receive data input by a user and output data to the user. It should be noted that some types of terminal devices may not have an input/output apparatus.

When data should be sent, after performing baseband processing on the to-be-sent data, the processor outputs a baseband signal to the radio frequency circuit. After performing radio frequency processing on the baseband signal, the radio frequency circuit sends the radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this disclosure.

In this embodiment of this disclosure, an antenna and a radio frequency circuit that have receiving and sending functions may be considered as a receiving unit and a sending unit (which may also be collectively referred to as a transceiver unit) of the terminal device, and a processor having a processing function may be considered as a processing unit of the terminal device. As shown in FIG. 12, the terminal device includes a receiving unit 1201, a processing unit 1202, and a sending unit 1203. The receiving unit 1201 may also be referred to as a receiver, a receiver circuit, or the like, and the sending unit 1203 may also be referred to as a transmitter, a transmitter circuit, or the like. The processing unit may also be referred to as a processor, a processing board, a processing module, a processing apparatus, or the like.

For example, in an embodiment, the receiving unit 1201 is configured to perform block S401 in the embodiment shown in FIG. 4. The processing unit 1202 is configured to perform block S402 in the embodiment shown in FIG. 4. The sending unit 1203 is configured to perform block S403 in the embodiment shown in FIG. 4.

For another example, in another embodiment, the receiving unit 1201 is configured to perform block S601 in the embodiment shown in FIG. 6. The processing unit 1202 is configured to perform block S602 in the embodiment shown in FIG. 6. The sending unit 1203 is configured to perform block S603 in the embodiment shown in FIG. 6.

For another example, in another embodiment, the receiving unit 1201 is configured to perform block S801 in the embodiment shown in FIG. 8. The processing unit 1202 is configured to perform block S802 in the embodiment shown in FIG. 8. The sending unit 1203 is configured to perform block S803 in the embodiment shown in FIG. 8.

For another example, in another embodiment, the receiving unit 1201 is configured to perform block S901 in the embodiment shown in FIG. 9. The processing unit 1202 is configured to perform block S902 in the embodiment shown in FIG. 9. The sending unit 1203 is configured to perform block S903 in the embodiment shown in FIG. 9.

For another example, in another embodiment, the receiving unit 1201 is configured to perform block S1101 in the embodiment shown in FIG. 11. The processing unit 1202 is configured to perform blocks S1102 and S1103 in the embodiment shown in FIG. 11. The sending unit 1203 is configured to perform block S1104 in the embodiment shown in FIG. 11.

Figure 13:
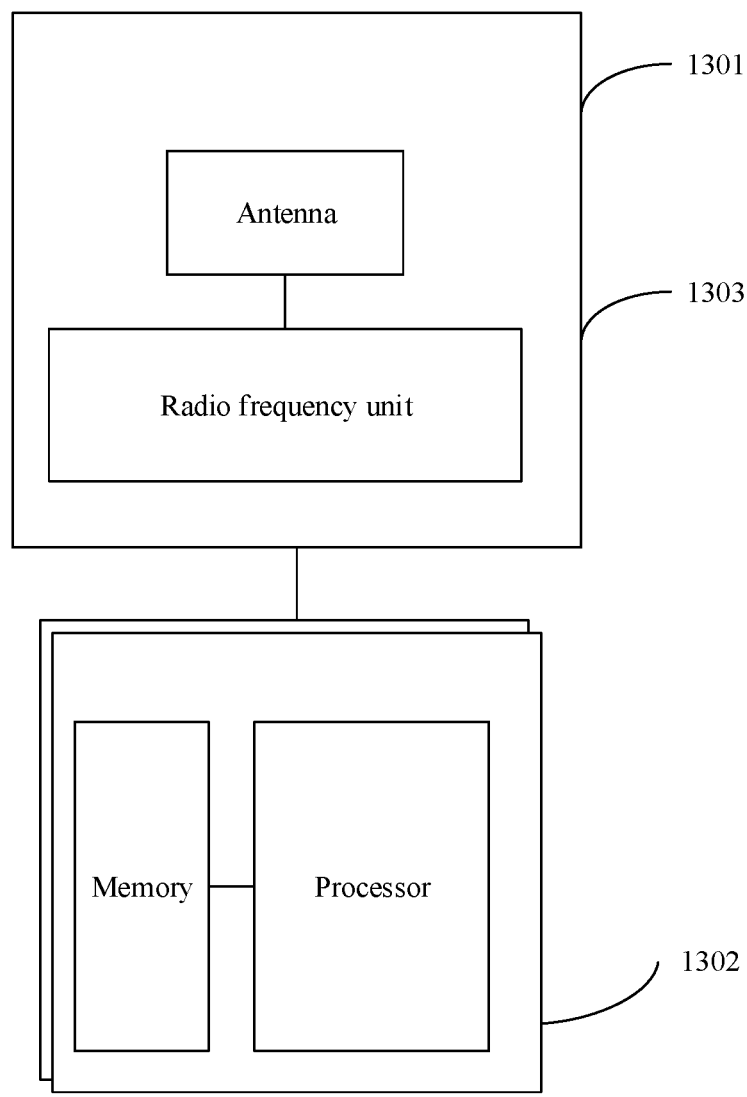
FIG. 13 is a schematic diagram of a simplified hardware architecture of a network device according to an embodiment of this disclosures.

FIG. 13 is a schematic diagram of a simplified structure of a network device. The network device includes a radio frequency signal transceiver and conversion part and a part 1302. The radio frequency signal transceiver and conversion part further includes a receiving unit 1301 part and a sending unit 1303 part (which may also be collectively referred to as a transceiver unit). The radio frequency signal transceiver and conversion part is mainly configured to receive/transmit a radio frequency signal and convert a radio frequency signal and a baseband signal. The part 1302 is mainly configured to perform baseband processing, control the network device, and the like. The receiving unit 1301 may also be referred to as a receiver, a receiver circuit, or the like, and the sending unit 1303 may also be referred to as a transmitter, a transmitter circuit, or the like. The part 1302 is usually a control center of the network device, and may be usually referred to as a processing unit, and is configured to control the network device to perform the blocks performed by a second communications apparatus in FIG. 4, FIG. 6, FIG. 8, FIG. 9, or FIG. 11. For details, refer to the descriptions of the foregoing related parts.

The part 1302 may include one or more boards. Each board may include one or more processors and one or more memories. The processor is configured to read and execute a program in the memory, to implement a baseband processing function and control the network device. If there are a plurality of boards, the boards can be interconnected to improve the processing capability. In an optional implementation, the plurality of boards may share one or more processors, or the plurality of boards share one or more memories, or the plurality of boards share one or more processors at the same time.

For example, in an embodiment, the sending unit 1303 is configured to perform block S401 in the embodiment shown in FIG. 4. The receiving unit 1301 is configured to perform block S403 in the embodiment shown in FIG. 4.

For another example, in another embodiment, the sending unit 1303 is configured to perform block S601 in the embodiment shown in FIG. 6. The receiving unit 1301 is configured to perform block S603 in the embodiment shown in FIG. 6.

For another example, in another embodiment, the sending unit 1303 is configured to perform block S801 in the embodiment shown in FIG. 8. The receiving unit 1301 is configured to perform block S803 in the embodiment shown in FIG. 8. The processing unit 1302 is configured to perform block S804 in the embodiment shown in FIG. 8.

For another example, in another embodiment, the sending unit 1303 is configured to perform block S901 in the embodiment shown in FIG. 9. The receiving unit 1301 is configured to perform block S903 in the embodiment shown in FIG. 9.

For another example, in another embodiment, the sending unit 1303 is configured to perform block S1101 in the embodiment shown in FIG. 11. The receiving unit 1301 is configured to perform block S1104 in the embodiment shown in FIG. 11. The processing unit 1302 is configured to perform block S1105 in the embodiment shown in FIG. 11.

In another optional implementation, with development of a system-on-chip (SoC) technology, all or some functions of the part 1302 and the part 1301 may be implemented by using the SoC technology, for example, implemented by a base station function chip. The base station function chip integrates components such as a processor, a memory, and an antenna interface. A program of a related function of the base station is stored in the memory, and the processor executes the program to implement the related function of the base station. Optionally, the base station function chip can also read a memory outside the chip to implement a related function of the base station.

A person of ordinary skill in the art may be aware that, in combination with the examples described in the embodiments disclosed in this specification, units and algorithm blocks may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this disclosure are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer-readable storage medium. When the program is performed, the processes of the methods embodiments are included. The foregoing storage medium includes: any medium that can store program code, such as a read-only memory (ROM), a random access memory (RAM), a magnetic disk, or an optical disc.

What is claimed is:

1. A communication method, comprising:
   receiving, by a terminal device, a reference signal sent by a network device;
   measuring, by the terminal device, the reference signal to obtain at least one piece of beam quality; and
   reporting, by the terminal device, differential beam quality indication information to the network device, wherein the differential beam quality indication information indicates one or more of the following: that beam quality reporting is less than a minimum value of beam quality in a differential range and that beam quality corresponding to the differential beam quality indication information is a reporting threshold value, and
   wherein reporting, by the terminal device, the differential beam quality indication information to the network device comprises:
   reporting, by the terminal device, the differential beam quality indication information to the network device responsive to determining that beam quality in the at least one piece of beam quality is greater than the reporting threshold value and less than the minimum value of beam quality in the differential range, wherein the differential beam quality indication information indicates that the beam quality reporting is less than the minimum value of beam quality in the differential range.

2. The method of claim 1, wherein the method further comprises:
   reporting, by the terminal device, indication information of a reference value of beam quality in the at least one piece of beam quality to the network device.

3. The method of claim 1 A communication method, comprising:
   receiving, by a terminal device, a reference signal sent by a network device;
   measuring, by the terminal device, the reference signal to obtain at least one piece of beam quality; and
   reporting, by the terminal device, differential beam quality indication information to the network device, wherein the differential beam quality indication information indicates one or more of the following: that beam quality reporting is less than a minimum value of beam quality in a differential range and that beam quality corresponding to the differential beam quality indication information is a reporting threshold value, and
   wherein reporting, by the terminal device, the differential beam quality indication information to the network device comprises:
   reporting, by the terminal device, the differential beam quality indication information to the network device responsive to determining that beam quality corresponding to the differential beam quality indication information is less than the reporting threshold value, wherein the differential beam quality indication information indicates that the beam quality corresponding to the differential beam quality indication information is the reporting threshold value.

4. The method of claim 3, wherein the method further comprises:
   reporting, by the terminal device, indication information of a reference value of beam quality in the at least one piece of beam quality to the network device.

5. A communications apparatus, comprising:
   a receiver, configured to receive a reference signal sent by a network device;
   a processor, configured to measure the reference signal to obtain at least one piece of beam quality; and
   a transmitter, configured to report differential beam quality indication information to the network device, wherein the differential beam quality indication information indicates one or more of the following: that beam quality reporting is less than a minimum value of beam quality in a differential range and that beam quality corresponding to the differential beam quality indication information is a reporting threshold value, wherein the transmitter is configured to report the differential beam quality indication information to the network device responsive to determining that beam quality in the at least one piece of beam quality is greater than the reporting threshold value and less than the minimum value of beam quality in the differential range, wherein the differential beam quality indication information indicates that the beam quality reporting is less than the minimum value of beam quality in the differential range.

6. The communications apparatus of claim 5, wherein the transmitter is further configured to report indication information of a reference value of beam quality in the at least one piece of beam quality to the network device.

7. A communications apparatus, comprising:
a receiver, configured to receive a reference signal sent by a network device;
a processor, configured to measure the reference signal to obtain at least one piece of beam quality; and
a transmitter, configured to report differential beam quality indication information to the network device,
wherein the differential beam quality indication information indicates one or more of the following: that beam quality reporting is less than a minimum value of beam quality in a differential range and that beam quality corresponding to the differential beam quality indication information is a reporting threshold value, and
wherein the transmitter is configured to report the differential beam quality indication information to the network device responsive to determining that the beam quality corresponding to the differential beam quality indication information is less than the reporting threshold value, wherein the differential beam quality indication information indicates that the beam quality corresponding to the differential beam quality indication information is the reporting threshold value.

8. The communications apparatus of claim 7, wherein the transmitter is further configured to report indication information of a reference value of beam quality in the at least one piece of beam quality to the network device.

* * * * *

UNITED STATES PATENT AND TRADEMARK OFFICE
CERTIFICATE OF CORRECTION

PATENT NO. : 11,445,388 B2
APPLICATION NO. : 16/858327
DATED : September 13, 2022
INVENTOR(S) : Peng Guan et al.

It is certified that error appears in the above-identified patent and that said Letters Patent is hereby corrected as shown below:

In the Claims

In Column 20, Line 23, Claim 3, delete "The method of claim 1 A communication method," and insert --A communication method,--.

Signed and Sealed this
Thirteenth Day of December, 2022

Katherine Kelly Vidal
*Director of the United States Patent and Trademark Office*